May 28, 1963  O. R. ROBERTS  3,091,115
APPARATUS FOR DETERMINING SOIL MOISTURE CONTENT
Filed Jan. 21, 1960  6 Sheets-Sheet 3

INVENTOR.
OSWALD R. ROBERTS.
BY
Christie, Parker & Hale
ATTORNEYS.

May 28, 1963  O. R. ROBERTS  3,091,115
APPARATUS FOR DETERMINING SOIL MOISTURE CONTENT
Filed Jan. 21, 1960  6 Sheets-Sheet 5

INVENTOR.
OSWALD R. ROBERTS
BY
ATTORNEYS.

May 28, 1963 O. R. ROBERTS 3,091,115
APPARATUS FOR DETERMINING SOIL MOISTURE CONTENT
Filed Jan. 21, 1960 6 Sheets-Sheet 6

Fig. 20.

INVENTOR.
OSWALD R. ROBERTS
BY
ATTORNEYS.

United States Patent Office 3,091,115
Patented May 28, 1963

3,091,115
APPARATUS FOR DETERMINING SOIL
MOISTURE CONTENT
Oswald R. Roberts, 647 Mountain View Road,
Altadena, Calif.
Filed Jan. 21, 1960, Ser. No. 4,165
2 Claims. (Cl. 73—73)

The invention relates to apparatus for measuring the moisture content of granular materials such as soil.

This application is a continuation-in-part of my co-pending application Serial No. 758,782, filed September 3, 1958, entitled "Method and Apparatus for Determining Soil Moisture Content," now abandoned.

The purposes of the invention are to provide method and apparatus for obtaining easily, accurately, and relatively inexpensively direct readings of changes of the moisture content of material without the use of auxiliary mechanical gauges. A further purpose of the invention is to provide a method for quickly and easily removing entrained gas from a liquid occupying internal chambers in the apparatus.

The method of the invention involves establishing a selected volume of gas which is free to change volumetrically responsive to changes of the "tension" force of moisture in the material being tested and measuring the changes of volume of the gas.

The apparatus of the invention is a moisture indicator which has a body having an internal chamber and a liquid permeable portion communicating between the internal chamber and the exterior of the body. Means are provided on the body whereby the internal chamber may be selectively opened and closed to the atmosphere. Means is provided which is adapted to indicate changes of the level of a liquid contained in the internal chamber.

Additional method of the invention removes gas entrained in a liquid contained in the internal chamber of a moisture indicator through particular manipulation of the moisture indicator so that the liquid is first sealed from atmosphere, then exposed to a gas space of reduced pressure so that the entrained gas will disassociate from the liquid and collect therein, and then, simultaneously, the volume of the gas space is reduced and it is vented to atmosphere so that the gases collected therein are expelled from the moisture indicator to the atmosphere.

In operation, the liquid permeable portion of the body is placed in intimate contact with the material to be tested, the internal chamber in the body is partially filled with liquid, such as water, to a selected point, and the chamber is closed to the atmosphere, thus establishing a predetermined volume of air in the internal chamber. Thereafter, as the moisture content of the material changes, the liquid level in the chamber changes in response thereto, thus changing the volume of air in the internal chamber. Consequently, measurement of the changes of liquid level or of the volume of the air is a direct measure of the changes of the moisture content of the material. This action of the liquid level in the chamber is brought about by changes of the "tension" force of the moisture in the material, which force increases as the material becomes drier and decreases as the material becomes wetter. Since the liquid in the chamber of the moisture indicator communicates through the permeable portion of the body with the moisture in the material, changes of the "tension" force are exerted directly on the liquid in the chamber, and this causes a change in the level of the liquid in the chamber.

Moisture indicators known in the art, commonly called "tensiometers," such as disclosed in the patents to L. A. Richards, Patent Nos. 2,023,490; 2,445,717; and 2,674,490 and in the patent to T. W. Prosser et al. No. 2,878,671, have serious disadvantages. One disadvantage is that a vacuum gauge or other auxiliary mechanical apparatus must be connected to the tensiometer in order to measure changes in the "tension" force of the moisture in the material being tested. The gauge or other apparatus adds to the overall initial and maintenance expenses of the tensiometer. It also tends toward unreliability and inaccuracy of the tensiometer due to the possibility of malfunctioning of the gauging mechanism and also due to the possibility of entry of air into the tensiometer through leaks in the gauging mechanism or its connections. Another disadvantage is the difficulty of removing entrained gases from the liquid in the tensiometer. Such gases can seriously affect the accuracy, responsiveness and even the operability of the tensiometer. Conventional methods for removing these gases are burdensome and may be expensive, time consuming, and of doubtful efficacy.

My invention obviates the disadvantages of known tensiometers described above. The invention will be more clearly understood by reference to the following detailed description thereof, taken in conjunction with the accompanying drawings, in which:

FIGS. 1 through 5 show a preferred embodiment of the invention. The moisture indicator shown has a body represented generally by the reference numeral 10. The body 10 is comprised of an elongated main tube 11 and an elongated scale tube 38. The main tube is shown partially inserted into material to be tested for changes of its moisture content, such as the soil 12. Comprising the main tube 11 are liquid permeable portion 13 and fluid impermeable portion 9 integrally connected together with a fluid tight joint 8. As used herein, the word "fluid" is intended to mean both gas and liquid. The permeable portion has an internal chamber 18, and the impermeable portion has an internal longitudinal chamber 16. The two chambers 18 and 16 communicate with each other. The permeable portion 13 closes one end of the chambers in the main tube and is generally conical in configuration but is truncated by a spherical end 14. The conical configuration of the permeable portion aids in thrusting the main tube into the material to be tested, whether or not a receiving hole has been prepared previously. Although it is preferred that the permeable portion have the internal chamber 18, such is not necessary and, if desired, the permeable portion may be a solid member which has a surface exposed to the chamber 16 in the impermeable portion. The permeable portion is preferably made of a porous ceramic material having small pores. It may be one of the permeable tips commercially available for conventional tensiometers, or it may be any liquid permeable material which will pass liquid but not particles of the material to be tested and which will not pass air when it has been wetted with the liquid used. If desired, the permeable portion may even be perforations or an aperture in the impermeable portion at one end portion thereof. The impermeable portion of the main tube is preferably cylindrical in shape and may be made of any fluid impermeable material, such as metal, but transparent plastic tubing is preferred. The chamber 16 in the impermeable portion is preferably a longitudinal circular bore such as would be present in commercially available plastic tubing. The main tube may be of any length desired, depending upon the depth in the material to be tested at which readings are to be obtained. The chamber 16 in the main tube has an open end 7 remote from the liquid permeable portion at which a circumferential groove 21 is formed in the surface of the chamber. The circumferential groove 21 seats a sealing annulus or O ring seal 22 made of resilient material, such as rubber. A main tube vent 24 is disposed in the impermeable portion of the main tube adjacent the sealing annulus and communicates between the interior chamber 16 of the main tube and atmosphere. The main tube vent 24 is selectively opened and closed to the atmosphere by means of a main tube valve 25.

The scale tube 38 is preferably cylindrical in shape and passes through the opening of the annulus 22 in fluid tight but longitudinally adjustable in relation thereto, such as a sliding fit. The scale tube is made of fluid impermeable material, preferably transparent, plastic being preferred. An internal longitudinal chamber 40, preferably a circular bore, is formed in the scale tube. The scale tube has an open end 43 and a tapered exterior surface 44 adjacent the open end to facilitate its insertion through the opening in the sealing annulus 22 and into the chamber 16 in the main tube in such manner that the chamber 40 communicates therewith. It is only necessary that the chamber 40 communicate with the chamber 16, so that the scale tube 38 need only have a liquid permeable portion disposed in the chamber 16, which may be either an open end of the chamber 40 or a porous ceramic or other liquid permeable cap or tip on such end. The other end of the scale tube chamber has a fluid tight seal 42, which may be a cap cemented to the scale tube or an integral closure of the scale tube. A scale tube vent 36 communicating between the scale tube chamber 40 and atmosphere is disposed in the scale tube remote from its open end 43 and spaced from its sealed end. A scale tube valve 34 is seated on the scale tube vent so that the vent can be selectively opened and closed to atmosphere. The scale tube carries a scale 47 preferably incised or otherwise imprinted directly thereon, although the scale may be a separate plate attached to or otherwise associated with the scale tube.

Important considerations relative to the accuracy and sensitivity of the moisture indicator are the initial volume of the scale tube void 51 (FIG. 5), which extends from the sealed end 42 of the scale tube to the scale tube vent 36, the cross-sectional area of the scale tube chamber 40, the nature of the scale 47, and the spacing of the zero indicium of the scale 47 from the sealed end 42 of the scale tube and from the scale tube vent. As used herein, the word "void" is intended to mean merely a space which is not occupied or filled with liquid or other than gaseous matter; the gaseous matter occupying the space thus intended by the word "void" may be at any pressure, either atmospheric or less or greater than atmospheric pressure.

As hereinafter explained in connection with the operation of the moisture indicator, the scale tube chamber is filled with liquid to the level of the scale tube vent 36 and the vent is then sealed. The scale tube vent thus serves as the index point for filling the scale tube chamber. This establishes the initial volume of the scale tube void 51, which extends from the sealed end of the scale tube to the index point. The liquid level in the scale tube chamber is then preferably set at the zero indicium of the scale. If desired, the filling index point and the zero indicium of the scale may be one and the same, but, as hereinafter explained, it is preferred that the filling index point be spaced a predetermined amount from the zero indicium of the scale toward the sealed end of the scale tube. As explained, the spacing of the filling index point from the sealed end of the scale tube determines the initial volume of the scale tube void. This spacing is arbitrarily determined, depending on the sensitivity desired. The larger the initial volume of the scale tube void, the more sensitive is the moisture indicator to changes of moisture content of the material being tested. This is true because the response of the moisture indicator to a change of the "tension" force of the moisture in the tested material acting on the liquid in the indicator is the creation of a counterbalancing change of pressure in the scale tube void acting on the surface of the liquid exposed thereto. This maintains static equilibrium of the body of liquid. The counterbalancing change of pressure is produced by a change of the volume of the scale tube void, which in turn is produced by a change of the level of the liquid in the scale tube chamber. Since the scale tube void is sealed from atmosphere, the product of its pressure and volume is a constant, assuming no change of temperature, in accordance with Boyle's law. Consequently, the larger the volume of the scale tube void, the larger the Boyle's law constant, and, therefore, the more the volume of, and hence the liquid level in, the scale tube void must change to produce a given change of pressure therein. To illustrate, if a 1 cc. volume and another 2 cc. volume, each at the same pressure, are each to have their initial pressured decreased one-half, they each must be doubled in volume, which will result in the 1 cc. volume being volumetrically increased only 1 cc. while the 2 cc. volume will be increased 2 cc. As a result, the moisture indicator is more sensitive to changes of the "tension" force and will measurably respond to smaller changes thereof.

Also, the smaller the cross-sectional area of the scale tube chamber, the more sensitive is the moisture indicator. This is true because the smaller the area of the scale tube chamber, the smaller the area of the surface of the liquid presented to the pressure in the scale tube void, and, therefore, a greater change of pressure must occur in the void to produce a given change in the total force acting on the surface to counterbalance a given change of the "tension" force of the material. As heretofore explained, the greater change in pressure in the scale tube void necessitates a larger change in the level of the liquid therein, thereby increasing the sensitivity of the moisture indicator.

Compensation for the weight of the body of liquid within the moisture indicator increases its accuracy. This compensation may be provided by allowing for a decrease of pressure in the scale tube void from its initial pressure (which is preferably but not necessarily atmospheric pressure) which will create a pressure differential, relative to atmospheric pressure, adequate to produce equilibrium of forces acting on the static body of liquid in the indicator when the permeable portion is not subject to any "tension" force of moisture in material being tested. In order to do this, the filling index point for the scale tube chamber, which is the scale tube vent 36, is positioned intermediate the zero indicium of the scale and the sealed end of the scale tube at a point which is spaced from the zero indicium of the scale an amount representing an increase of the volume of the scale tube void between the vent and the zero indicium sufficient to produce the necessary decrease of pressure in the void. The amount of the spacing of the index point from the zero indicium of the scale is determined by the application of conventional principles of mechanics to a given moisture indicator.

The scale 47 is arbitrarily determined in order that it indicates relative changes of the amount of moisture in the material being tested. Preferably, the scale is formulated so that it indicates the degree or percentage of partial vacuum in the scale tube void 51 extending from the sealed end of the scale tube to each indicium of the scale. In this case, the number 8 on the scale would indicate a partial vacuum of 80% relative to the initial pressure of the scale tube void, or, since the initial pressure of the scale tube void is atmospheric, a pressure in the scale tube void of 20% of atmospheric pressure. Scale readings of the percentage of vacuum in the scale tube void directly indicate changes of moisture content of the material being tested, because as the material becomes drier its "tension" force increases, thus causing a decrease of liquid in the scale tube in order to decrease the pressure in the scale tube void sufficiently to counterbalance the change of "tension" force and maintain static equilibrium of the forces acting on the body of liquid in the moisture indicator. Thus, the drier the material, the less the volume of liquid in the scale tube and the higher the percentage of vacuum in the scale tube void extending from the sealed end of the scale tube to the liquid surface in the scale tube. The indicia of the scale increase in spacing as the scale indicates a drier condition of the material. This is necessary in order that the distance between any two indicia of the scale shall represent an equivalent amount of change of moisture content of the material being tested. As heretofore explained, the larger volume of the scale tube void when in the drier range of the scale necessitates a larger volumetric increase of the volume of the void than in the wetter range of the scale in order to produce a given counterbalancing change of pressure in the void responsive to a given change of the "tension" force of the material being tested. Alternatively, the indicia of the scale may be equally spaced and the bore of the scale tube tapered so that it has a larger cross-sectional area in the drier range of the scale to achieve the same effect.

Correction may be introduced into the scale for the changes of the total weight of the body of liquid in the indicator due to its changes of volume as the liquid level in the scale tube changes, but this normally may be ignored without noticeable loss of accuracy, especially if the cross-sectional area of the scale tube chamber is small.

Figures 1, 2, 3, 4, 7:
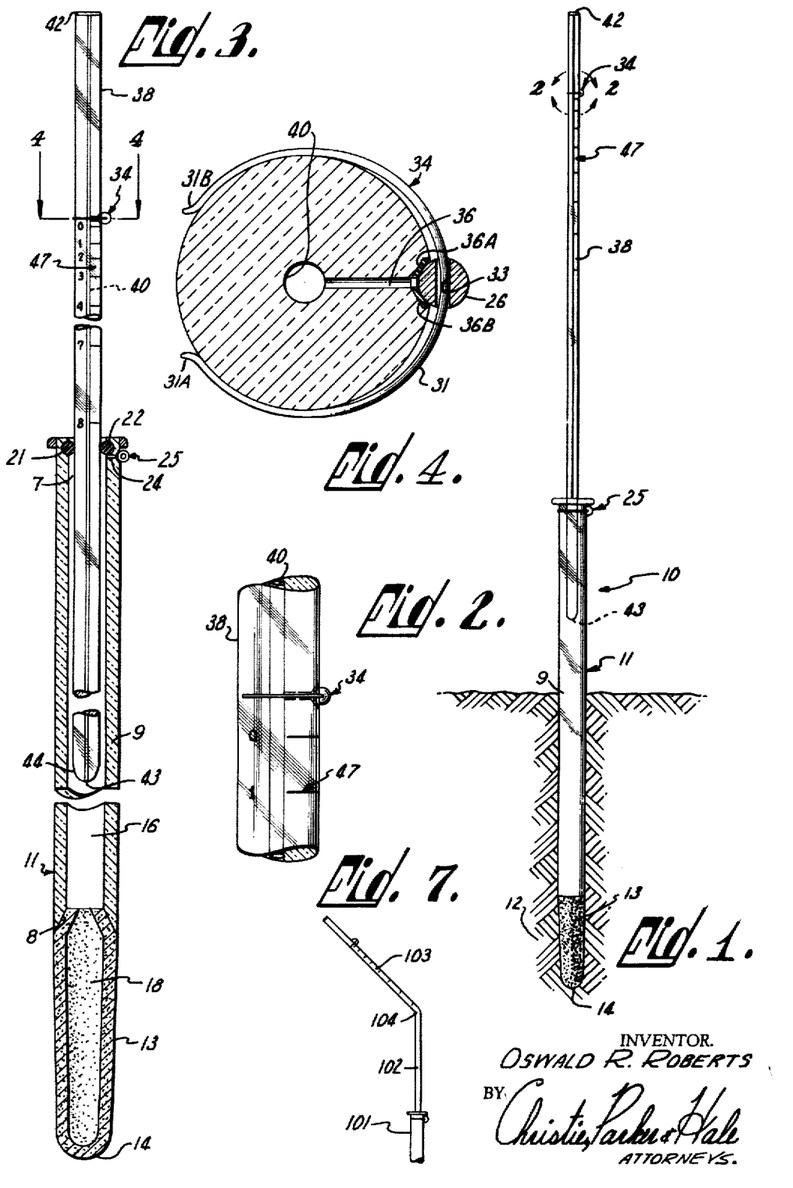
FIG. 1 is an elevational view of a preferred embodiment of the invention.
FIG. 2 is an enlarged fragmentary elevational view of the area 2—2 in FIG. 1.
FIG. 3 is a fragmentary sectional elevational view of the embodiment shown in FIG. 1.
FIG. 4 is an enlarged plan sectional view taken along the line 4—4 in FIG. 3.
FIG. 7 is a fragmentary elevational view of a modification of the invention.

FIG. 4 shows an enlarged cross-sectional view of the scale tube vent 36 and its valve 34 taken along the section 4—4 in FIG. 3. As can be seen from FIG. 4, the vent 36 terminates in a conical recess 36A at its end remote from the internal chamber 40. A geometrically similar conical resilient valve seat 36B is disposed in the conical recess. A sealing valve ball 26, preferably made of metal, having a central bore 33, seats on the valve seat and is compressively urged against the seat by means of a discontinuous resilient band 31, preferably made of spring steel wire, which passes through the bore in the valve ball and engages the exterior of the member containing the vent. The resilient band preferably terminates in spaced ends 31A and 31B, which facilitate flexing of the band when the valve ball is moved from the valve seat. Alternatively, the band may completely encircle the body containing the vent. To open the vent and chamber 40 to atmosphere, the valve ball is lifted from the seat and moved laterally in order to bear against the exterior surface of the member containing the vent. This is possible due to the resilient nature of the band 31.

The main tube vent 24 and its valve 25 are identical in structure and operation to the scale tube vent 36 and its valve 34, described above.

To operate the moisture indicator shown in FIGS. 1 through 5, the chambers in the main tube are first filled with liquid. To do this, the scale tube is removed from the opening in the sealing annulus 22 and the chambers 18 and 16 in the main tube 11 are filled with liquid through the opening in the annulus. If the material to be tested is soil which contains plants, the liquid is preferably water, and if desired, a plant nutrient additive may be added to the water. Also, if desired, a conventional chemical may be added to the water in order to indicate certain chemical properties of the soil, such as litmus to indicate acidity of the soil through interflow of the water in the indicator and the moisture in the soil. The liquid may be dyed for easier reading. The liquid as described above may be used in any of the hereinafter described embodiments. It is now desirable to degas the liquid, since otherwise gas entrained in the liquid will rise during operation of the moisture indicator to the partial vacuum in the scale tube void and by increasing its volume decrease its pressure, thus introducing error into the relationship between the level of the liquid in the scale tube chamber and the "tension" force of the moisture in the material being tested.

The following method is used to degas the liquid in the main tube chambers 18 and 16: The main tube valve 25 is closed and the moisture indicator is placed in a substantially vertical position with the end 7 of the chamber 16 up. This substantially vertical position is preferably maintained during the degassing operation. The end 44 of the scale tube is then inserted through the opening in the sealing annulus and into the liquid occupying the chamber 16. During this insertion of the scale tube, the scale tube valve 34 may be open or closed, but if closed during the insertion, it is opened after the insertion has been completed in order to form a void in the scale tube chamber 40 extending from the scale tube vent to the sealed end 42 of the scale tube, the remainder of the scale tube chamber being occupied with the liquid. Insertion of the scale tube is complete when liquid occupies the scale tube chamber up to the level of the scale tube vent 36. Then the scale tube valve is closed, and with the main tube valve remaining closed, the scale tube is partially withdrawn from the chamber 16 of the main tube. The withdrawal must not be so great that there is a break of communication between the open end 43 of the scale tube and the liquid in the main tube chambers. This withdrawal of the displacing volume of the scale tube causes the level of the liquid in the main tube chambers to lower below the main tube vent 24 and the level of the liquid in the scale tube to lower below the level of the scale tube vent 36. Consequently, a partial vacuum is created in the void space 53 (FIG. 5) formed at the end 7 of the main tube and in the scale tube void 51. The partial vacuum in these voids causes gas entrained in the liquid occupying the chambers in the main tube and the scale tube to rise in the form of bubbles and be released from the liquid into the void 53 and the scale tube void 51, respectively. The gas, in disassociating from the liquid, may form bubbles on the surfaces of the chambers, and the rising of these bubbles to the voids will be facilitated by tapping the exterior of the main tube and scale tube to free the bubbles from the surface to which they adhere.

After a delay of a few minutes to enable the entrained gases to disassociate from the liquid and collect in the void 53 and the scale tube void 51, the scale tube, with its valve 34 still closed, is inserted further into the liquid occupying the chambers in the main tube, and, simultaneously, the main tube valve 25 is opened. The displacing volume of the scale tube causes a decrease in the volume of the void 53 with the consequent rise of pressure therein, which results in the gases collected in the void being expelled through the main tube vent to the atmosphere. The main tube valve 25 is then closed. Further insertion of the scale tube into the chambers of the main tube with the scale tube valve open during such insertion similarly expels to atmosphere the compressed gases in the scale tube void. The insertion of the scale tube with its valve open is continued until the liquid level is up to the scale tube vent, and the scale tube valve is then closed. The scale tube vent thus serves as the index point for the filling of the scale tube chamber. The liquid occupying the chambers in the main tube and the scale tube is now degassed and the chamber in the scale tube is filled with the liquid to the filling index point. Consequently, the predetermined initial volume of the scale tube gas void, extending from the filling index point to the sealed end of the scale tube, is set.

The level of liquid in the scale tube chamber is now preferably set at the zero indicium of the scale by partially withdrawing the scale tube, with its valve closed and with its open end 43 continuously in communication with the liquid in the main tube chambers, until the liquid level is at the zero indicium. The moisture indicator is now ready for operation.

The above-described degassing and setting operations are preferably performed before placing the moisture indicator in the material to be tested, but they may be performed after so doing. In either event, the moisture indicator is placed in the material to be tested with its permeable portion at the level therein at which measurement is desired of relative changes of the moisture content of the material. The material should be packed in intimate contact with the permeable portion of the moisture indicator in order that there is direct communication of the liquid in the chamber in the permeable portion and the moisture in the material being tested with as little intervening air space as possible. When the moisture indicator has been filled with liquid, degassed, set, and properly placed in the material, all as described above, the level of liquid in the scale tube chamber will thereafter vary in response to changes of the moisture content of the material, as heretofore described, thereby permitting measurement of such changes by means of the relation of the liquid level to the scale carried by the scale tube.

It is important that the permeable portion of the indicator be kept saturated with the liquid which occupies the internal chambers in the indicator in order to maintain a liquid seal between the liquid in the indicator and external gases, since when the permeable portion is saturated, it will not pass gas. If this liquid seal is broken, air will pass through the permeable portion and enter the liquid in the indicator, and, if such air rises to the scale tube void, it will introduce error into the readings of the indicator as heretofore explained. An advantage of the moisture indicator shown in FIGS. 1 through 5 is that the liquid contained in the annular portion of the chamber 16 surrounding the portion of the scale tube which is inserted into the chamber 16 act as a water reservoir from which the permeable portion may be maintained in a wet condition so as to maintain the liquid seal.

Another advantage of the moisture indicator shown in FIGS. 1 through 5 is that in operation, the void 53 in the main tube acts as a trap for gases which enter the main tube chambers through the permeable portion of the main tube or otherwise, since it is of reduced pressure due to the partial withdrawal of the scale tube as heretofore described. This gas trap keeps such gases from rising in the liquid occupying the scale tube chamber to the scale tube void 51 and introducing error as heretofore described. A further advantage of this embodiment is that, due to the slidable relationship of the scale tube to the main tube, the moisture indicator can be degassed or reset as often as desired during operation without removing it from the material in which it is placed.

Figures 5, 6, 8, 9:
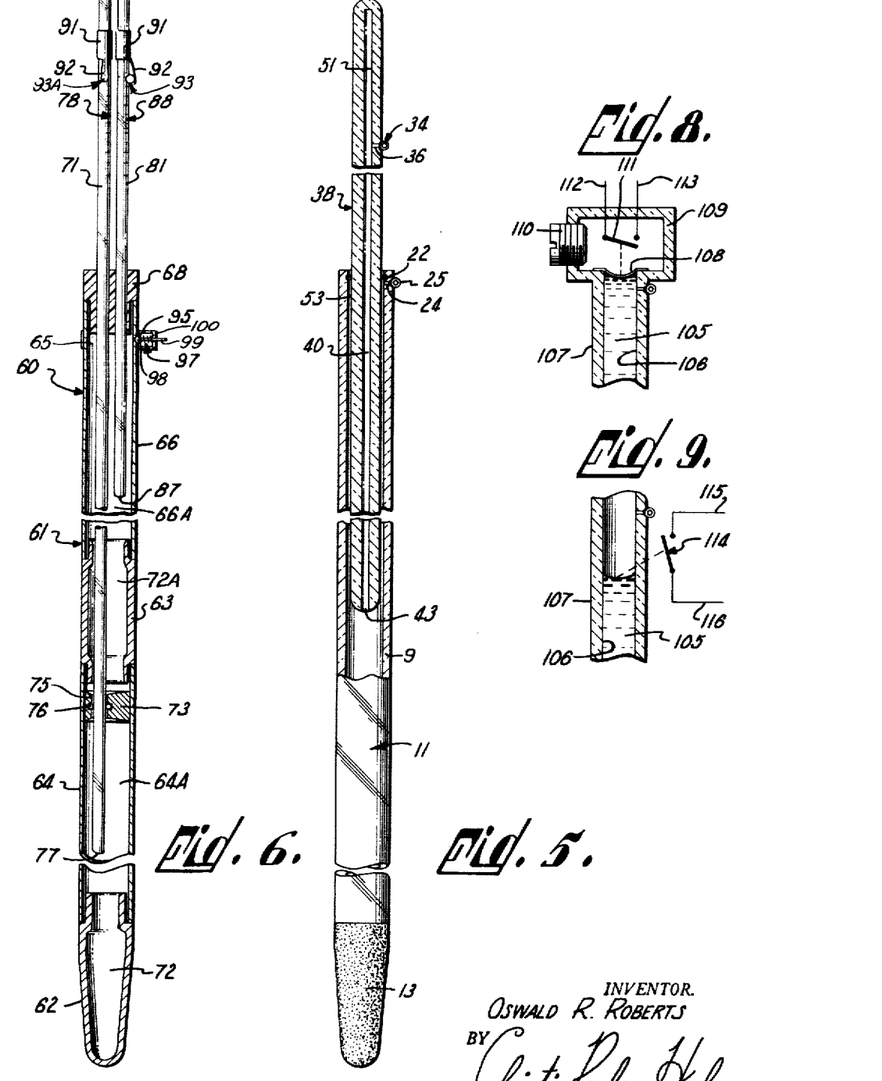
FIG. 5 is a fragmentary elevational view partially in section of the embodiment shown in FIGS. 1 and 3.
FIG. 6 is a fragmentary sectional elevational view of an alternate embodiment of the invention.
FIG. 8 is a schematic fragmentary sectional elevational view of a modification of the invention.
FIG. 9 is a schematic fragmentary sectional elevational view of a modification of the invention.

FIG. 6 shows another embodiment of the invention. The purpose of this embodiment is to measure simultaneously the changes of moisture content at two different depths in the material being tested. The moisture indicator has body means 60 comprised of an elongated main tube 61 having an internal longitudinal chamber and a plurality of scale tubes 71 and 81. The main tube has a plurality of liquid permeable portions 62 and 63 and a fluid impermeable remainder comprised of portions 64 and 66. The permeable portions are made of a ceramic material having small pores, and each has a chamber 72, 72A within. Each impermeable portion of the main tube is connected by a fluid tight connection to a liquid permeable portion and has an internal chamber 64A, 66A in communication with the chamber in the permeable portion to which it is connected. A sealing member 73 disposed in the chamber in the main tube effects a fluid tight separation of the pair of impermeable and permeable portions 62 and 64 from the similar pair 63 and 66. A second sealing member 68 is removably disposed in the end 65 of the chamber in the main tube remote from the permeable portions and effects a fluid tight seal of the chambers in the main tube from atmosphere. The sealing member 68 is made of resilient material, such as rubber. Preferably, the permeable and impermeable portions of the main tube are cylindrical and have substantially cylindrical chambers. The impermeable portions of the main tube are preferably made of transparent plastic tubing.

At the end 65 of the main tube adjacent the sealing member 68 is a main tube vent 95 communicating between the chambers in the main tube and atmosphere. The main tube vent may be opened and closed to the atmosphere by means of a main tube valve 97. The main tube valve has a spring loaded sphere 98 attached to a pull rod 99 mounted in a bracket 100 held to the body by an encircling strap. The sphere 98 seats on a resilient conical valve seat disposed in the exterior end of the main tube vent 95 in the same manner as the valve ball of the scale tube valve 34 heretofore described for the embodiment shown in FIGS. 1 through 5.

Sealing member 68 has a longitudinal hole for each scale tube, each of which removably receives a scale tube in sealed and longitudinally adjustable relation to the main tube, such as a sliding fit. The sealing member 73 has an off-center opening 75 in which a resilient seal 76, such as a rubber O ring, is seated to removably receive a scale tube in sealed and longitudinally adjustable relation to the main tube.

There is a scale tube for each pair of permeable and impermeable portions of the main tube. Except for their valves 93 and 93A, the scale tube 71 and 81 are identical in all respects to the scale tube 38 heretofore described for the embodiment shown in FIGS. 1 through 5. The valves 93 and 93A on the scale tubes each consist of a resilient sphere attached to the resilient leg 92 of the bracket 91. The resilient sphere seats on the scale tube vent and is urged against it by the leg 92 to seal it from atmosphere. Either scale tube vent is unsealed by lifting the leg 92 with a fingernail away from the tube. The chamber in each scale tube communicates with a different liquid permeable portion of the main tube. Thus, scale tube 71 extends through sealing members 68 and 73 and communicates at 77 with the internal chambers 64A and 72 in the main tube. Similarly, scale tube 81 extends through sealing member 68 and communicates at 87 with the internal chambers 66A and 72A in the main tube. Consequently, the two scale tubes are of different lengths.

The embodiment shown in FIG. 6 is degassed and set in substantially the same manner as heretofore described for the embodiment shown in FIGS. 1 through 5. The chambers 64A and 72 are first degassed with the scale tube 71 withdrawn from such chambers and from sealing member 73 but inserted in the chambers 72A and 66A. The gas entrained in the liquid in the chambers 72 and 64A is thus free to pass through the opening in the seal 76. The under face of sealing member 73 is concave in order to guide the gas bubbles to the opening 75. After the liquid in the chambers 64A and 72 has been degassed, the liquid level is set in the chamber of the scale tube 71 as heretofore described for the embodiment shown in FIGS. 1 through 5, the scale tube being inserted through the seal 76 so that its open end 77 communicates with the liquid in the chambers 64A and 72. The liquid in chambers 72A and 66A and the scale tube 81 are then degassed and set in the same manner as heretofore described for the embodiment shown in FIGS. 1 through 5.

FIG. 7 illustrates an alternate embodiment of the invention in which the scale tube 102 in the main tube 101 is bent at 104 so that the indicating scale 103 is more readily visible without bending to the level of the tube itself. The bend is preferably slightly above the maximum calculated penetration of the scale tube into the chambers of the main tube 101. The bend thereby does not interfere with the full insertion of the scale tube into the liquid filled main tube 101 to effect the purposes of the instrument. A curved scale tube can also be used, but the bent tube is more economically fabricated, and hence, preferable.

FIGS. 8 and 9 illustrate an adaptation of the apparatus of the invention in which the level of the liquid 105 within the chamber 106 enclosed in an upper tube 107 of a moisture indicator in accordance with the invention is used to actuate electrical control equipment. Illustrated schematically in FIG. 8 is an embodiment in which the chamber 106 is sealed at its top by a flexible diaphragm 108. The diaphragm moves in response to changes of pressure in the chamber 106 relative to the gas pressure within the confines of a bulb 109 whose volume and thus pressure is adjustable by means of a piston 110 so that the differential in pressure at which the switch 111 will be actuated may be predetermined. The piston may be an exteriorly threaded cylinder or may be movably sealed by other means. The movement of the diaphragm actuates the switch 111 which closes to complete a circuit between electrical leads 112 and 113 which may be connected to any desired electrical system. Such a system might control the off-on valve of an irrigating system or control indicating lights on a control panel remote from the material being tested. A similar system may be actuated by the mechanism schematically represented in FIG. 9. A switch 114 which when closed completes a circuit through leads 115 and 116 is actuated by any convenient means directly by the change of the liquid level of the liquid 105 within chamber 106. In this instance tube 107 is equivalent in function to the scale tubes heretofore described. The change in the level of the liquid 105 could either open or close switch 114 to control any number of functions related to the mositure content of the material being tested.

Figures 13, 14, 15, 16, 16A:
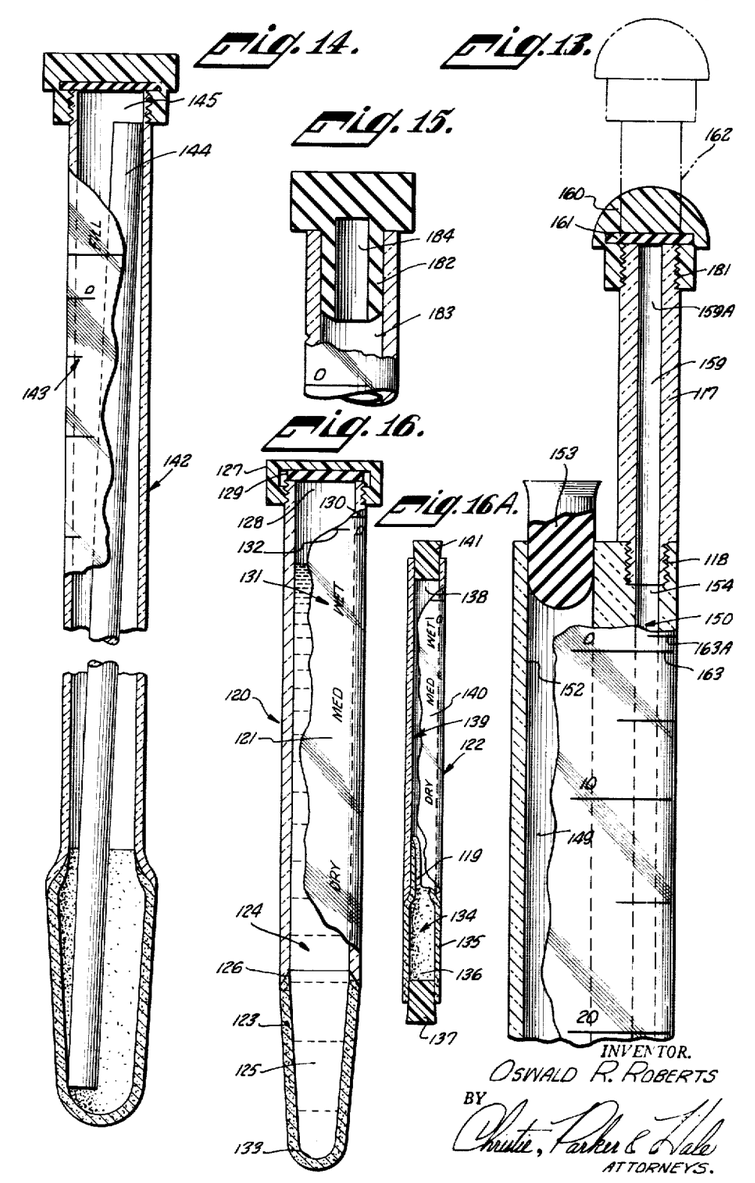
FIG. 13 is an elevational view of a modification of the embodiment shown in FIG. 12 partially broken away along a longitudinal section.
FIG. 14 is a fragmentary elevational view partially broken away along a longitudinal section of another embodiment of the invention.
FIG. 15 is an enlarged elevational view partially broken away along a longitudinal section of a modification of the invention.
FIG. 16 is an elevational view partially broken away along a longitudinal section of another embodiment of the invention.
FIG. 16A is an elevational view partially broken away along a longitudinal section of another embodiment of the invention.

FIG. 16 illustrates a second preferred embodiment of my invention. The moisture indicator shown has elongated integral body means 120 having an internal longitudinal chamber 124 adapted to hold a liquid. The body means 120 is comprised of a liquid permeable portion 123 and a fluid impermeable remainder 121. The permeable portion is located at one end of the body, closing at 133 one end of the longitudinal chamber in the body, and has an internal longitudinal chamber or bore 125 which communicates with the internal longitudinal chamber 124 in the impermeable portion, which is preferably cylindrical in shape. The impermeable and permeable portions are connected by a fluid tight joint 126 to form an integral body. The impermeable portion is preferably cylindrical in shape. It is made of material resistant to soil corrosion, which preferably is transparent, plastic tubing being preferred because of its resistance to breakage. It may be of any length desired, depending upon the depth in the material being tested at which measurements of the changes of moisture content are to be made. The permeable portion is made of porous ceramic material having small pores, such as casting plaster. It is the same as the permeable portion heretofore described for the embodiment shown in FIGS. 1 through 5, and such description is fully applicable hereto, except insofar as stated to the contrary. The chamber 124 in the impermeable portion is open at its end 128 remote from the permeable portion. A removable sealing element or cap 127 is threadedly received on the exterior of the open end 128 of the impermeable portion in order that the chambers in the body may be opened and closed to atmosphere by removing or replacing the cap. The sealing element includes a resilient gasket 129 disposed between the cap and the body to insure a fluid tight seal when the cap is screwed on the end of the body and tightened. The impermeable portion of the body carries a scale 131 having its zero indicium 132 spaced a predetermined amount from the end of the internal chamber adjacent the sealing element and a filling index line 130 spaced a predetermined amount from the zero indicium of the scale toward the sealing element. The indicia of the scale 131 are only the broad designations "wet," "med.," and "dry" as shown, but, if desired, the scale may be more closely calibrated in the manner of the scale 47 heretofore described for the embodiment shown in FIGS. 1 through 5. The scale is preferably imprinted directly on the impermeable portion as shown, which, if of the preferred transparent construction, allows easy direct readings of the level of a liquid in the internal chamber within the body. Alternatively, the scale may be a separate plate or element attached to the impermeable portion of the body. The spacing of the zero indicium of the scale from the end of the chamber adjacent the sealing element, the spacing between the indicia of the scale, and the spacing of the filling index line 130 from the zero indicium of the scale are each determined in accordance with the principles heretofore described therefor in connection with the embodiment shown in FIGS. 1 through 5.

To operate the moisture indicator shown in FIG. 16, the cap and gasket are removed from the body and the body filled with liquid to the filling index line 130. The liquid is the same described for the embodiment shown in FIGS. 1 through 5. The cap and gasket are then secured on the body, thus sealing the end 128 of the chamber 124 from the atmosphere and establishing the initial volume of the void as the volume of gas extending from the filling index line to the surface of the gasket 129 remote from the cap. After the liquid level in the chamber has dropped to the zero indicium of the scale, the moisture indicator is ready for use. If the moisture indicator has not already been placed in the material to be tested, it is now placed in such material and, as heretofore described, the material packed in intimate contact with the permeable portion. Thereafter, the moisture indicator operates in accordance with the principles heretofore explained in connection with the embodiment shown in FIGS. 1 through 5.

FIG. 16A illustrates another embodiment of the invention. The moisture indicator shown is identical in construction and operation with the heretofore described moisture indicator shown in FIG. 16, except as noted herein. The permeable portion 135 of the body means 122 has a chamber 134 which is open at 136 rather than closed as in the embodiment shown in FIG. 16. A removable conically shaped resilient plug 137 is seated in the portion 136 of the chamber in sealed engagement with the sides thereof in order that the chamber 134 may be opened and closed to atmosphere by removing or replacing the plug 137. The end 138 of the chamber 139 in the impermeable portion 140 may be opened and closed to atmosphere by means of a plug 141 identical in shape and operation to the plug 137. The additional open end 136 is advantageous because when plugs 137 and 141 are both removed, the chambers 134 and 139 may be more easily filled with the liquid because there will be less tendency for air bubbles to form in the chambers between the liquid and a closed end of the chamber, which is particularly likely when the cross-sectional area of the chamber is small. An elongated lip 119 extends from the permeable portion 135 into the internal chamber 139 in the impermeable portion along the surface of such chamber. The lip may be made of any "wicking" material which will conduct the liquid in the chambers of the body, such as string, but preferably it is made of the same porous ceramic material as the permeable portion 135. It is connected, preferably integrally, to the permeable portion 135. The lip 119 is only preferable, not essential, and may be omitted if desired. The lip 119 has the advantage of conducting liquid to the permeable portion 135 in order to maintain the heretofore described liquid seal in the permeable portion, which might otherwise be broken by an air bubble forming in the chamber of the permeable portion. The formation of such a bubble is particularly likely when the chambers are of small cross-sectional area, and the lip 119 may be provided in any of the embodiments described herein to meet this problem. In operation, the plug 137 is, of course, sealingly seated in the open end 136 in order to form a closed end on the chamber 134. The same applies to the plug 141, which serves the same function as the cap 127 and gasket 129 of the embodiment shown in FIG. 16.

FIG. 14 shows another embodiment of the invention. The moisture indicator shown is identical in construction and operation to the embodiment shown in FIG. 16 and heretofore described, except as noted herein. The scale 143 has more finely graduated indicia in the same manner as the heretofore described scale 47 of the embodiment shown in FIGS. 1 through 5. This embodiment also differs from the embodiment shown in FIG. 16 in that a plunger rod 144 is freely disposed within the chambers in the body means 142 of the moisture indicator. The plunger rod 144 extends substantially the entire longitudinal length of the internal chamber in the body and is of substantially less cross-sectional area than such chamber, a rod having a cross-sectional area of approximately one-half to one-third of the cross-sectional area of the chamber being satisfactory. The plunger rod is solid and preferably cylindrical in shape. It is preferably made of the same material as the impermeable portion of the body. The plunger rod is useful in filling the internal chamber in the body in that as liquid is poured into the chamber through the open end 145 thereof, the plunger rod 144 may be grasped at its upper end and simultaneously worked up and down within the chamber so as to break any air bubbles which have formed, thus acting as a piston forcing the liquid into the chamber. The plunger rod also serves the purpose of reducing the volume of liquid to be handled in the chamber and tends to conduct the liquid past bubbles which may have formed in the chamber in order to maintain the heretofore described liquid seal of the permeable portion. The plunger rod 144 normally remains within the chamber during operation of the moisture indicator.

Figure 12:
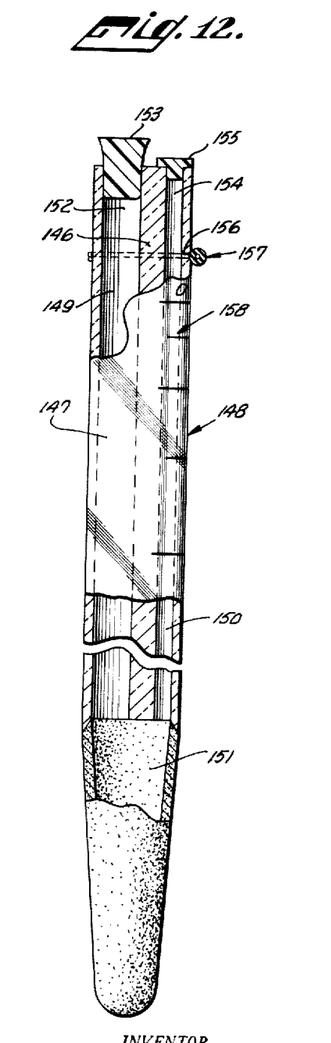
FIG. 12 is a fragmentary elevational view partially broken away along a longitudinal section of another embodiment of the invention.

FIG. 12 shows another embodiment of the invention. The moisture indicator shown is similar in construction to the heretofore described moisture indicator shown in FIG. 16, except as noted herein. The impermeable portion 147 of the body 148 is elongated and contains two longitudinally extending internal chambers 149 and 150, preferably cylindrical in shape. The chambers 149 and 150 are adjacent but separated from each other by an internal integral longitudinal fluid impermeable web 146 in the body, and each have an end communicating with a common chamber 151 in the permeable portion of the body. The chamber 149 has an open end 152 remote from the liquid permeable portion in which a resilient removable plug 153 is disposed in sealed relation to the surface of the chamber, in order that the end 152 of the chamber may be opened and closed to atmosphere by removal or insertion of the plug 153 in such chamber. The chamber 150 has its upper end 154 remote from the liquid permeable portion sealed from the atmosphere by means of a cap 155 cemented on the body. A vent 156 communicates between the chamber 150 and the atmosphere. The chamber 150 may be opened and closed to the atmosphere by means of the valve 157 which selectively opens and closes the vent 156. A scale 158 is carried on the impermeable portion of the body in order that the liquid level within the chamber 150 may be measured. The vent 156 and valve 157, the spacing of the vent from the zero indicium of the scale, the scale 158 and the spacing of its zero indicium from the sealed end of the chamber 150, and the cross-sectional area of the chamber 150 are the same in construction, principle, and operation as the corresponding items on the scale tube 38 heretofore described for the embodiment shown in FIGS. 1 through 5, and reference thereto should be made for further details. The cross-sectional area of the chamber 149 is considerably larger than the cross-sectional area of the chamber 150 in order that an ample volume of liquid may be present in the internal chamber in the body without increasing the cross-sectional area of the chamber 150, which would decrease sensitivity of the indicator in accordance with the principles heretofore explained in connection with the embodiment shown in FIGS. 1 through 5. A purpose of the second chamber 149 is to provide a reservoir of liquid to maintain the liquid seal in the permeable portion of the body, the nature and necessity of this liquid seal having been heretofore described in connection with the embodiment shown in FIGS. 1 through 5. Another purpose of the larger area of the chamber 149 is to provide a trap for air bubbles formed in the chamber 151 from air entering the permeable portion, since the bubbles would tend to enter chamber 149 rather than the chamber 150 due to the larger cross-sectional area of the former. Also, the large area of chamber 149 enables easier filling of the chambers in the body. The operation of this embodiment is similar to the heretofore described operation of the moisture indicator shown in FIG. 16, except that the chambers in the body are filled through the open end 152 with the plug 153 removed and with the valve 157 open. Filling of the chambers in the body is continued until the liquid level in the chamber 150 is up to the level of the vent 156, at which point the valve 157 is closed, the plug 153 is inserted in the chamber 152 in sealed relationship thereto and the moisture indicator is thereafter ready for operation as heretofore described.

FIG. 13 shows a modification of the embodiment shown in FIG. 12. In FIG. 13, the end 154 of the chamber 150 is not sealed from the atmosphere by means of a permanently attached cap, as is the embodiment shown in FIG. 12, but carries threads 118 which threadedly and removably receive an extension 117 which has mating threads. The extension 117 has an internal chamber 159 of predetermined volume which communicates with the chamber 150. The end 159A of the chamber 159 is open and may be selectively opened and closed to the atmosphere by means of the cap 160 and gasket 161 which are threadedly received on the exterior of the extension at 181. The cap 160 and gasket 161 are identical in construction with the cap 127 and gasket 129 heretofore described for the embodiment shown in FIG. 16. Since the chambers 159 and 150 may be opened and closed to the atmosphere by removing or replacing the cap 160 and gasket 161, the vent 156 and valve 157 on the embodiment shown in FIG. 12 are omitted. The extension 117 may be of any desired length, as shown by the dotted lines 162 outlining an extension of greater longitudinal length. The advantage of the extension is that it permits the volume of the void extending from the zero indicium 163 of the scale to the sealed end 159A of the chamber 150 to be selectively varied so that sensitivity of the moisture indicator can be increased as desired by adding an extension 117 having a desired predetermined volume of its internal chamber, thereby varying the sensitivity of the moisture indicator in accordance with the principles heretofore described in connection with the embodiment shown in FIGS. 1 through 5. The operation of this embodiment is similar to that of the embodiment shown in FIG. 12 except that in filling the instrument the cap 160 and gasket 161 are removed and liquid is then poured in to the chambers through the open end 152 of the larger chamber with the plug 153 removed until the liquid level in the chamber 150 is at the filling index line 163A. The cap 160 and the gasket 161 are screwed on the extension 157 in order to seal the chamber 158 from the atmosphere, and then the plug 153 is replaced in sealed engagement with the walls of the end 152 of the chamber 149. The moisture indicator is then ready for operation.

Figure 10:
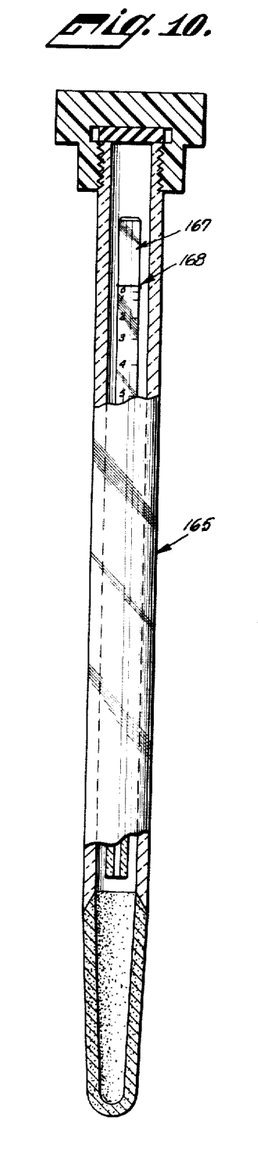
FIG. 10 is an elevational view partially broken away along a longitudinal section of another embodiment of the invention.

FIG. 10 shows another embodiment of the invention. The moisture indicator shown has a main body 165 identical in construction with the body 120 of the heretofore described embodiment shown in FIG. 16, except that the main body 165 does not carry a scale as does the body of the embodiment shown in FIG. 16. In FIG. 10, a scale tube 167 is freely carried in the internal chamber in the main body 165. The scale tube 167 is identical in construction with the scale tube 38 described heretofore for the embodiment shown in FIGS. 1 through 5. The cross-sectional area of the scale tube 167 is considerably less than the cross-sectional area of the chamber in the main body 165, a scale tube cross-sectional area of one-half to one-third of the cross-sectional area of the chamber being satisfactory. The length of the scale tube 167 is less than the total length of the chamber in the main body 165 so that it may move freely longitudinally within the chamber. In operation, the cap and gasket are removed from the main body and the scale tube is withdrawn from the chamber therein. The chamber in the main body is then completely filled with liquid. Then the scale tube 167, with its valve 168 open, is inserted into the liquid occupying the chamber in the main body until the liquid level in the scale tube chamber is up to the level of the vent which the valve 168 seals, at which point the valve 168 is closed. The scale tube is inserted further into the chamber in the main body so that it is wholly within the body and the cap and gasket are then replaced on the main body. The moisture indicator is then ready for operation in the manner heretofore described.

Figure 11:
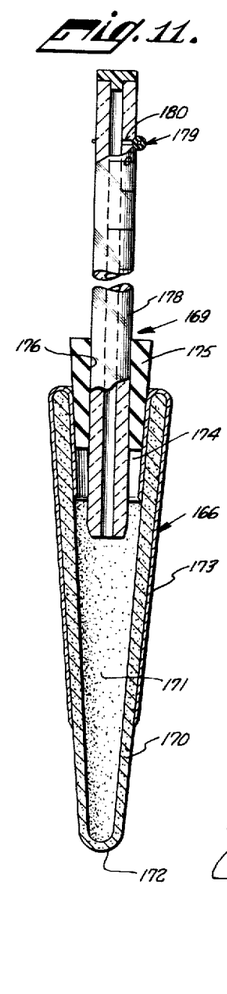
FIG. 11 is a fragmentary elevational view partially broken away along a longitudinal section of another embodiment of the invention.

FIG. 11 shows another embodiment of the invention. In FIG. 11, the moisture indicator shown has body means 169 comprised of a main body 166 and an elongated scale tube 178. The main body is made of porous ceramic material having small pores and has an internal longitudinal chamber 171. The portion 170 of the main body is liquid permeable and the remainder of the main body is rendered fluid impermeable by means of a fluid impermeable coating 173, such as ceramic surface glazing. An advantage of the surface coating 173 on the main body is that it facilitates variation and control of the area of the permeable portion of the main body in the manufacture of the indicator. The chamber 171 is closed at one end 172 by the permeable portion and has an open end 174 remote from the liquid permeable portion. A removable resilient plug 175 is seated in the open end 174 of the chamber in sealed engagement with the surface of the chamber.

The plug 175 has a longitudinal bore 176 which receives in sealed but slidable relationship a scale tube 178. The construction of the scale tube 178 is identical to the construction of the scale tube 38 heretofore described for the embodiment shown in FIGS. 1 through 5. In operation, the plug 175 is removed, the chamber 171 completely filled with liquid, the plug 175 is then inserted into the chamber 171 in sealed engagement with the surface thereof and the scale tube 178, with its valve 179 open, is inserted through the bore 176 in the plug and into the chamber 171 until the liquid level in the scale tube chamber is at the level of the vent 180, at which point the valve 179 is closed, the scale tube is withdrawn until the liquid level therein is preferably at the zero indicium of the scale, and the moisture indicator is ready for operation in accordance with the heretofore explained principles.

FIG. 15 shows a modified form of plug which may be used to seal the open end of the internal chamber in the impermeable portion of any of the various embodiments of the invention which utilize a plug or cap sealing means. The plug may be constructed of resilient material and have a force fit within the bore or it may be received by threads (not shown) on the end of the impermeable portion. The plug has a projection 182 of exterior dimension substantially equal to the dimension of the chamber 183. A chamber 184 of predetermined volume is formed in the projection. The advantage of this form of plug is that through variation of the volume of the projection and the volume of the chamber in the projection, the volume of the void in the chamber 183 may be varied, and thus by using plugs of different dimensions the sensitivity of the moisture indicator may be varied in accordance with the principles heretofore explained in connection with the embodiment shown in FIGS. 1 through 5.

Figure 17:
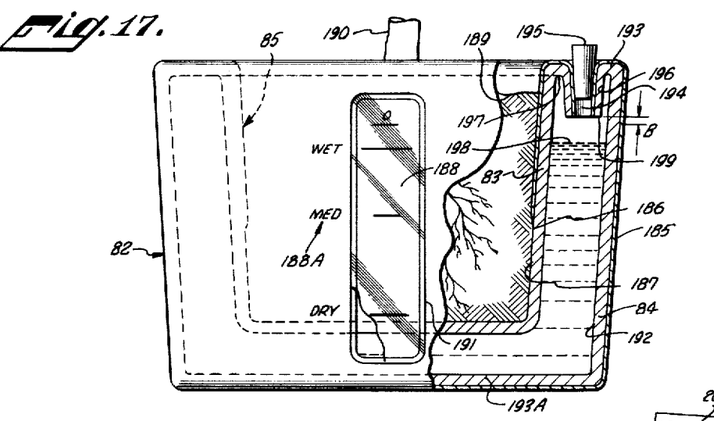
FIG. 17 is a side view partially broken away along a vertical section of another embodiment of the invention.

Another embodiment of the invention is shown in FIG. 17. This embodiment has body means 82 comprising a continuous inner wall 83 and a continuous outer wall 84. The inner and outer walls define a continuous internal chamber 192 in the body. The inner wall defines a recess 85 adapted to receive soil 189 and a plant 190. The outer wall defines the top 193, bottom 193A, and sides of the body. The internal chamber 192 has a base portion adjacent the base 193A and elongated side portions oriented substantially normally to the base portion. The recess 85 is surrounded on its sides and bottom by the internal chamber 192. The body is made of liquid permeable porous ceramic material having small pores. A fluid impermeable coating 185 is carried on the body. The fluid impermeable coating completely covers the exterior surface of the outer wall, including the top portion 193 and bottom portion 193A, and also completely covers the interior surface of the inner wall to the point 186. The portion 187 of the inner wall, defined by the bottom and the interior portion of the walls of the recess 85 and located remotely of the end 197 of the elongated side portions of the chamber 192, is thus a liquid permeable portion of the body communication between the internal chamber and the exterior of the body, while the remainder of the body is fluid impermeable. An elongated opening oriented substantially normally to the bottom portion 193A of the body and communicating with the chamber 192 is formed in the outer wall, and a transparent insert 188, preferably transparent plastic, is disposed in the opening and connected to the outer wall of the body by a continuous peripheral fluid tight connection 191. Thus, the portion of the body defined by the insert 188 is transparent to the internal chamber in the body. A scale 188A having zero, "wet," "med." and "dry" indicia is carried by the body. The zero indicium of the scale is located remotely from the liquid permeable portion, and the indicia of the scale extend away from the zero indicium toward the liquid permeable portion. The scale may be attached to the exterior surface of the outer wall adjacent to the insert, or, preferably, imprinted directly on the insert and the body, as shown. The scale 188A is the same as the heretofore described scale 131 for the embodiment shown in FIG. 16 and is formulated in accordance with the principles heretofore explained for the embodiment shown in FIGS. 1 through 5, to which reference is to be made for further details of the scale 188A. A vent 194 communicating between the atmosphere and the internal chamber 192 is formed in the top portion 193 of the outer wall of the body remote from the liquid permeable portion. A removable resilient stopper 195 sealingly fits in the vent 194 and permits the internal chamber 192 to be opened and closed to the atmosphere by removal or replacement of the stopper in the vent. A peripheral wall 196 surrounds the vent 194, extends into the chamber 192 a predetermined amount, and terminates at 199. The extension of the wall 196 into the chamber 192 determines the heretofore described filling index point when the internal chamber is filled with liquid to the bottom 199 of the wall. The zero indicium of the scale is spaced a predetermined amount from the end 197 of the internal chamber remote from the liquid permeable portion, and the end 199 of the vent wall is spaced from the zero indicium of the scale a predetermined amount "B" in accordance with the principles heretofore described in connection with the embodiment shown in FIGS. 1 through 5.

To operate the embodiment shown in FIG. 17, the stopper 195 is removed and the chamber 192 is filled with water. The water may contain additives as heretofore described for the embodiment shown in FIGS. 1 through 5. The chamber is filled to the level of the end 199 of the vent wall. The stopper 195 is then sealingly seated in the vent 199, thus closing the chamber 192 from the atmosphere and establishing the initial volume of the void in the chamber. Thereafter, the relative changes of moisture content in the soil 189 can be measured by observing the liquid level in the chamber 192 through the transparent insert 188, in accordance with principles heretofore described for the embodiments shown in FIGS. 1 through 5 and FIG. 16. A unique feature of this embodiment is that it not only serves as a moisture indicator for the soil 189 but also performs an automatic watering function for the plant 190, since as the soil 189 becomes drier, the liquid 189 passes through the permeable portion 187 of the body into the soil and sustains the plant 190 until the dry reading on the scale is noticed and the plant watered either by external application of water to the soil 189 or addition of water to the internal chamber.

Figures 18, 19:
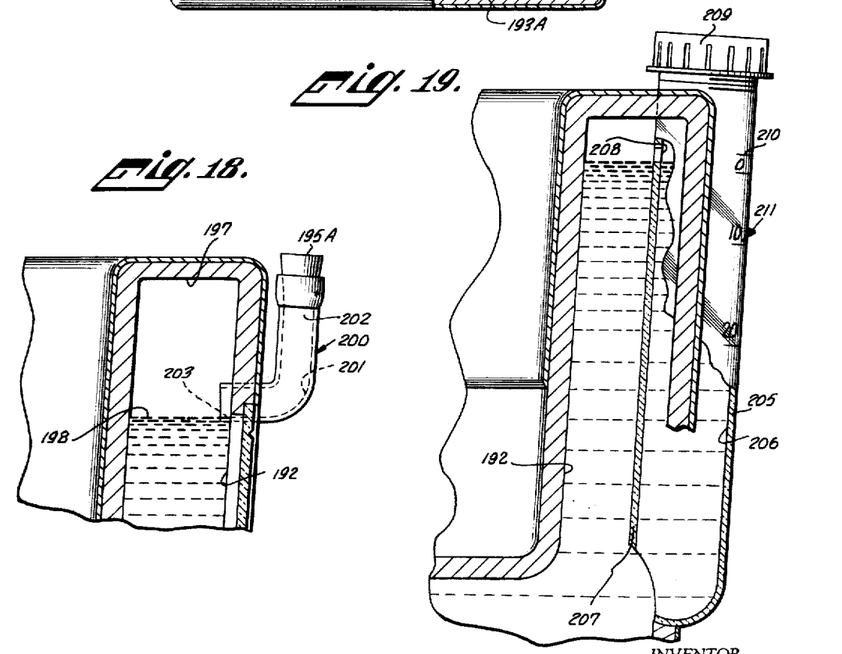
FIG. 18 is a side view partially in section of a modification of the embodiment shown in FIG. 17.
FIG. 19 is a side view partially in section of a modification of the embodiment shown in FIG. 17.

FIG. 18 shows a modification of the embodiment shown in FIG. 17. In FIG. 18, the vent 194 and its associated stopper 195 and vent walls 196 (FIG. 17) are omitted and their function performed by an elbow filling tube 200 which has an internal chamber 201 communicating with the chamber 192. The end 202 of the chamber 201 sealingly receives a removable plug 195A, which cooperate in the same manner as heretofore described for the plug 195 and vent 194 of the embodiment shown in FIG. 17. The bottom surface 203 of the chamber 201 performs the same function as the end 199 of the vent walls in the embodiment shown in FIG. 17, thereby serving as the filling index point, and in other respects this modification is operated in the same way as the embodiment shown in FIG. 17.

In FIG. 19, there is shown another modification of the embodiment shown in FIG. 17. In FIG. 19 a fluid impermeable scale tube 205, having an internal chamber 206, is connected to the body by a fluid tight connection. The scale tube chamber 206 communicates with the body chamber 192 through a cutaway portion 207 of the scale tube. At the end 208 of the scale tube chamber, the scale tube threadedly receives a cap 209 which is similar in structure and function to the cap 127 heretofore described for the embodiment shown in FIG. 16. The scale tube carries a filling index mark 210 and a scale 211 which are similar to the heretofore described scales for the other embodiments and which are determined in accordance with the principles heretofore explained in connection with the embodiment shown in FIGS. 1 through 5. In this modification, the scale tube and its associated structure replace the transparent insert 188, the vent 199 and stopper 195 of the embodiment shown in FIG. 17. The operation of this modification is the same as that of the embodiment shown in FIG. 17, the index point 201 being used in the same manner as the end 199 of the vent wall of the embodiment shown in FIG. 17.

Figure 20:
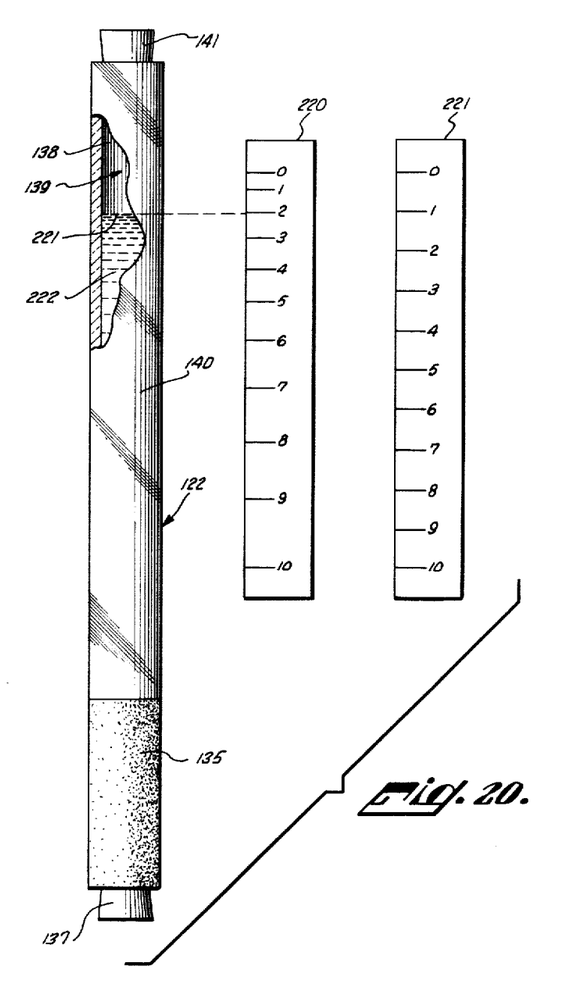
FIG. 20 is a side view partially broken away of another embodiment of the invention.

FIG. 20 illustrates another embodiment of the invention. The moisture indicator shown is identical in construction and operation with the heretofore described moisture indicator shown in FIG. 16A and, except as noted hereafter, all that has been heretofore stated in describing the moisture indicator shown in FIG. 16A is applicable hereto and identical reference numerals have been used to identify similar features. In this embodiment, the fluid impermeable portion of the body 140 does not carry the indicia of a scale, but instead, a scale 220 is associated therewith in a manner so that the scale is adapted to measure changes of the level 221 of the liquid 222 occupying the internal chambers in the body 122 of the moisture indicator. For example, the impermeable portion 140 of the body may be of the preferred transparent construction and the scale 220 merely held on the side of the body opposite the side of the body facing the eye of the observer and the liquid level 221 read by sighting through the transparent impermeable portion 140 and obtaining a reading of the scale. The scale 220 is arbitrarily determined in accordance with the principles heretofore explained in connection with the scale 47 of the embodiment shown in FIGS. 1 through 5. The scale 220, as shown, may have indicia of increasing spacing in accordance with such principles or, alternatively, if desired, the scale may, as shown at 221, have equally spaced indicia in accordance with such heretofore described principles. If desired, the changes of the liquid level 221 within the body may be measured by other than a scale, such as calipers or any other convenient method. This embodiment also differs from the embodiment shown in FIG. 16A in that there is no filling index line. Instead, the initial volume of the void 138 is selectively made of any size, depending upon the sensitivity and accuracy desired, in accordance with the principles heretofore described in connection with the embodiment shown in FIGS. 1 through 5. Thus, the larger the volume of the scale tube void 138, the more responsive and accurate the moisture indicator.

The invention is not to be understood as restricted to the details as set forth above, since these may be modified within the scope of the appended claims without departing from the spirit and scope of the invention.

I claim:

1. A moisture indicator comprising a first tube defining an internal chamber, a liquid-permeable section on the first tube for communication of liquid between the exterior of the first tube and the internal chamber therein, a scale tube disposed partially within the internal chamber of the first tube and partially exteriorly of the first tube, means for movably mounting the scale tube on the first tube for movement of the scale tube into and out of the internal chamber in the first tube and for providing a seal against atmosphere between the internal chamber in the first tube and the scale tube, said scale tube defining on internal chamber extending through the scale tube which is closed to atmosphere at the end of the scale tube disposed exteriorly of the first tube and which communicates with the internal chamber in the first tube through the portion of the scale tube disposed within the internal chamber in the first tube, a first vent in the first tube communicating between the internal chamber therein and the exterior thereof, a second vent in the portion of the scale tube disposed exteriorly of the first tube and communicating between the internal chamber in the scale tube and the exterior thereof, valve means for selectively sealing and opening each of the first and second vents, and indicia on the portion of the scale tube disposed exteriorly of the first tube for defining a predetermined initial volume of air in the internal chamber in the scale tube between the level of an indicating liquid in the internal chambers of the first tube and the scale tube and the closed end of the internal chamber in the scale tube and indicating the magnitude of such volume of air in the internal chamber of the scale tube relative to the initial volume of air therein responsive to changes in the level of an indicating liquid therein.

2. A moisture indicator comprising an elongated first tube defining an internal chamber extending the length thereof, of liquid-permeable portion of the first tube at one end thereof for liquid flow between the internal chamber in the first tube and the exterior of the first tube, an elongated scale tube defining an internal chamber extending its length, said scale tube having an end portion disposed within the internal chamber of the first tube and having its remainder extending exteriorly of the first tube, said internal chamber in the scale tube being sealed from atmosphere at the end of the scale tube exterior of the first tube and the end portion of the scale tube disposed in the internal chamber of the first tube communicating with the internal chamber in the first tube, said scale tube being made of transparent fluid-impermeable material, sealing means extending between the scale tube and the first tube for movably mounting the scale tube on the first tube for movement of the scale tube into and out of the internal chamber of the first tube and for effecting an airtight seal between the scale tube and the internal chamber of the first tube, said sealing means being located adjacent the end of the first tube remote from the liquid-permeable portion thereof, said first tube defining a vent adjacent its end remote from the liquid-permeable portion thereof communicating between the internal chamber of the first tube and the exterior of the first tube, first valve means on the first tube for selectively opening and closing the first vent to the exterior of the first tube, said scale tube defining a second vent disposed in the portion of the scale tube extending exteriorly of the first tube, said second vent communicating between the internal chamber of the scale tube and the exterior of the scale tube, valve means on the scale tube for selectively opening and closing the second vent to the exterior of the scale tube, first indicium on the scale tube disposed a predetermined extent from the sealed end of the internal chamber of the scale tube to define a predetermined volume of such chamber extending between the first indicium and the sealed end of such internal chamber, and indicia on the scale tube extending from the first indicium away from the sealed end of the internal chamber of the scale tube to indicate the magnitude of the volume of the internal chamber of the scale tube extending between the sealed end of such chamber and any one of the indicia relative to the volume of the internal chamber of the scale tube defined between the first indicia and the sealed end of such internal chamber.

References Cited in the file of this patent

UNITED STATES PATENTS

| | | |
|---|---|---|
| 199,785 | Burgin | Jan. 29, 1878 |
| 2,339,369 | Baker | Jan. 18, 1944 |
| 2,420,356 | Compa | May 13, 1947 |
| 2,801,538 | Matson | Aug. 6, 1957 |
| 2,878,671 | Prosser et al. | Mar. 24, 1959 |

FOREIGN PATENTS

| | | |
|---|---|---|
| 435,815 | Germany | Oct. 18, 1926 |
| 158,349 | Australia | Apr. 15, 1954 |

UNITED STATES PATENT OFFICE
CERTIFICATE OF CORRECTION

Patent No. 3,091,115

May 28, 1963

Oswald R. Roberts

It is hereby certified that error appears in the above numbered patent requiring correction and that the said Letters Patent should read as corrected below.

Column 15, line 45, for "189" read -- 198 --; column 17, line 17, for "of", first occurrence, read -- a --.

Signed and sealed this 24th day of December 1963.

(SEAL)
Attest:

ERNEST W. SWIDER
Attesting Officer

EDWIN L. REYNOLDS
Acting Commissioner of Patents